United States Patent [19]
Murakami

[11] Patent Number: 6,101,196
[45] Date of Patent: Aug. 8, 2000

[54] SRTS RECEIVER FOR INTERPOLATING A PLURALITY OF INTERPOLATION PULSES DURING THE PERIOD OF THE RTS INFORMATION TRANSFER

[75] Inventor: Kurenai Murakami, Tokyo, Japan

[73] Assignee: NEC Corporation, Tokyo, Japan

[21] Appl. No.: 09/030,421

[22] Filed: Feb. 25, 1998

[30] Foreign Application Priority Data

Feb. 26, 1997 [JP] Japan ..................................... 9-042115

[51] Int. Cl.[7] ....................................................... H04L 7/08
[52] U.S. Cl. ........................... 370/516; 370/518; 375/376
[58] Field of Search ..................................... 370/252, 395, 370/503, 507, 508, 509, 510, 253, 516, 518; 375/359, 373, 376; 331/18, 25

[56] References Cited

U.S. PATENT DOCUMENTS

| | | | |
|---|---|---|---|
| 5,260,978 | 11/1993 | Fleischer et al. | 375/376 |
| 5,506,835 | 4/1996 | McTiffin | 370/252 |
| 5,555,261 | 9/1996 | Nakayama et al. | 370/395 |
| 5,608,731 | 3/1997 | Upp et al. | 370/516 |
| 5,902,411 | 5/1999 | Murakami et al. | 331/18 |

FOREIGN PATENT DOCUMENTS 7-38570  2/1995  Japan .

OTHER PUBLICATIONS

Lau et al., "Synchronous Techniques for Timing Recovery in BISDN", *IEEE Transaction on Communications.* vol. 43, No. 2/3/4, Feb./Mar./Apr. 1995, pp. 1810–1818.

Murakami, "Jitter in Synchronous Residual Time Stamp", *IEEE Transactions on Communications*, vol. 44, No. 6, Jun. 1996, pp. 742–748.

*Primary Examiner*—Ricky Ngo
*Attorney, Agent, or Firm*—Sughrue, Mion, Zinn, Macpeak & Seas, PLLC

[57] ABSTRACT

An SRTS receiver for reproducing a user clock by applying combined pulses to phase synchronous oscillation unit, the SRTS receiver comprises a RTS information receiving unit for generating pulses in N-clock cycle of the user clock on average according to the received RTS information, an interpolation pulse generating unit for generating interpolation pulse signals to be inserted in the pulses generated by the RTS information receiving unit, and a pulse combining unit for combining the interpolation pulses supplied from the interpolation pulse generating unit and the pulses generated by the RTS information receiving unit and supplying the same.

16 Claims, 12 Drawing Sheets

FIG. 8

| DIFFERENCE VALUE D | GATE OUTPUT PULSE INTERVAL A | ENCODER OUTPUT D |
|---|---|---|
| 4 | 5220 | 144 |
| 5 | 5221 | 145 |
| 6 | 5222 | 146 |
| 7 | 5223 | 147 |
| 8 | 5224 | 148 |
| 9 | 5225 | 149 |
| 10 | 5226 | 150 |
| 11 | 5227 | 151 |
| 12 | 5228 | 152 |
| 13 | 5229 | 153 |
| 14 | 5230 | 154 |
| 15 | 5231 | 155 |
| 0 | 5232 | 156 |
| 1 | 5233 | 157 |
| 2 | 5234 | 158 |
| 3 | 5235 | 159 |

SRTS RECEIVER FOR INTERPOLATING A PLURALITY OF INTERPOLATION PULSES DURING THE PERIOD OF THE RTS INFORMATION TRANSFER

BACKGROUNDS OF THE INVENTION

1. Field of the Invention

The present invention relates to an SRTS receiver for reproducing the user signal clock at a receiving party, by means of SRTS (Synchronous Residual Time Stamp) used to transfer the bit rate information of a user signal from a sending party to a receiving party, when an ATM cell accommodates a CBR (Constant Bit Rate) signal asynchronous with a network as the user signal by the AAL Type1.

2. Description of the Related Art

The SRTS is a method defined by ITU-T recommendation I. 363. In a sending party, the frequency ratio between the bit rate of a CBR user signal and a reference clock derived from a network clock is measured, expressed as the RTS (Residual Time Stamp) information of four bits, and transferred to a receiving party by use of the CSI bit within the SAR-PDU header of AAL Type 1. In the receiving party, according to the received 4-bit RTS information, the user signal clock is reproduced, by use of the reference clock derived from the same network clock as the sending party.

The conventional SRTS receiver will be described with reference to the drawings. FIG. 9 is a block diagram showing the constitutional example of a RTS information creating circuit shown in ITU-T recommendation I. 363, FIG. 10 is a block diagram showing the constitutional example of the conventional SRTS receiver, FIG. 11 is a flow chart showing the operation of the SRTS receiver shown in FIG. 10, and FIG. 12 is a block diagram showing the constitutional example of a PPL (phase locked loop) circuit in the SRTS receiver of FIG. 10.

First, the description will be made about the operation of the RTS information creating circuit of ITU-T recommendation I. 363 shown in FIG. 9. A reference clock derived from the network clock is supplied to an input terminal 911. The frequency of the reference clock is defined by the I. 363. A 4-bit counter 901 is activated upon receipt of a reference clock, divides the reference clock by 16-clock and supplies the output. The 4-bit counter 901 is free-running without being reset. The counted output value S91 of the 4-bit counter 901 is supplied to a D-flip flop circuit 903 via the signal line of four bits. While, the clock of the CBR user signal (user clock) is supplied to an input terminal 912. Upon receiving the user clock, a modulo N counter 902 is activated. The value "N" in the modulo N counter 902 means the number of bits of user signal during the transfer period of the RTS information. According to I. 363, the RTS information is to be transferred once in every eight cells. Since the SAR-PDU payload within eight cells is 3008 bits, if there is no other header (such as CS-PDU header), the value "N" becomes "3008". The modulo N counter 902 generates a pulse signal S92 every time N-counting the user clock. The pulse signal S92 is supplied to the D-flip flop circuit 903 of four bits. The D-flip flop circuit 903 samples four bits of the counted output value S91 of the 4-bit counter 901 according to the pulse signal S92. The sampled 4-bits information is called RTS information and is transferred from the output terminal 913 to the ATM channel.

Assuming that the reference clock frequency is defined as fnx and that the user clock frequency is defined as fs, the 4-bit counter 901 counts $M=N \times fnx/fs$ on average during the N-clock period of the user clock. Assuming that the integral part of M is defined as Mq, the 4-bit counter 901 actually counts Mq or Mq+1 and the average count number becomes M count during the N-clock period of the user clock.

This time, the description will be made about a SRTS receiver. As the conventional SRTS receiver, such a device is well known as disclosed in, for example, the article "Synchronous Techniques for Timing Recovery in BISND" (R. C. Lau and P. E. Fleischer, IEEE Transactions on Communications, Vol.43, No2/3/4, February/March/April, 1995) and the article "Jitter in Synchronous Residual Time Stamp" (K. Murakami, IEEE Transactions on Communications, Vol.44, No6, June 1996). FIG. 10 is a view showing the constitution of the SRTS receiver disclosed in the same articles. FIG. 11 is a time chart of the circuit of FIG. 10. Hereinafter, the operation of the device shown in FIG. 10 will be described with reference to FIG. 11.

In FIG. 10, the RTS information receiving means 1000 surrounded by the dotted line is a circuit portion for processing the received RTS information. At first, the operation of the RTS information receiving means 1000 will be described. The RTS information which is supplied from the output terminal 913 of the RTS information creating circuit shown in FIG. 9 to the input terminal 1011 via the ATM channel, is once stored into the FIFO circuit 1003 for absorbing the jitter delay in the ATM channel and read out sequentially. The 4-bit counter 1001 is activated by the reference clock received from the input terminal 1012 and it is free-running. The output signal S102 therefrom is supplied to a comparator 1004 together with the output signal S101 of the FIFO circuit 1003, where both signals are compared with each other. The comparator 1004 generates pulses when both signals coincide. The time chart of FIG. 11 shows the case where the value of the output signal S101 from the FIFO circuit 1003 is "5". As illustrated in FIG. 11, the output S103 of the comparator 1004 becomes train of pulses. On the other hand, the modulo ML counter 1002 is activated by the reference clock received from the input terminal 1012, stops when it counts ML pulses of the reference clock, and generates the gate signal S104. The gate circuit 1005, upon receipt of the gate signal S104 from the modulo ML counter 1002, operates to pass output pulse train S103 of the comparator 1004. When the gate circuit 1005 passes one pulse of the train, the gate output signal S105 is supplied and the modulo ML counter 1002 is reset, to stop the output of the gate signal S104. Simultaneously, the FIFO circuit 1003 restarts reading out new RTS information. The gate circuit 1005 always passes only one pulse out of the output pulse train S103 of the comparator 1004. Assuming that the value "ML" in the modulo ML counter 1002 is "Mq-8" according to I. 363, the interval of the output pulse S105 of the gate circuit 1005 becomes equal to Mq-clock cycle or Mq+1-clock cycle of the reference clock according to the received RTS.

FIG. 12 shows the constitutional example of the PLL circuit 1006 of FIG. 10. The PLL circuit 1006 of FIG. 12 comprises a phase comparator (PC) 1201, a direct-current amplifier (AMP) 1202, a voltage controlled oscillator (VCO) 1203, and a modulo N counter 1204. The interval of the gate output S105 supplied to the PLL 1006 in FIG. 10 is equal to the N-clock cycle of the user clock on average. Therefore, the signal obtained by the modulo N counter 1204 dividing the user clock by N, is supplied to the phase comparator (PC) 1201 and compared to the gate output S105.

The above-mentioned conventional SRTS receiver, however, has the following problems. When the ratio of the frequency division of the PLL circuit shown in FIG. 12 is "N", the value "N" usually becomes such a huge value as "3008" according to I. 363. The loop gain of the PLL circuit is inversely proportional to "N", and if the value "N" is large, the loop gain of the PLL circuit becomes extremely small. Generally, the PLL circuit deteriorates in various characteristics if the loop gain is small. Particularly, the characteristic of the phase noise suppression is deteriorated, and a phase noise generated by the voltage controlled oscillator appears in the output, thereby causing the deterioration in the quality of the reproduced user clock.

This will be shown by use of concrete numerical example. Assuming that the gain of the phase comparator 1201 is defined as K1[V/rad], the gain of the direct-current amplifier 1202 is defined as K2, and the conversion gain of the voltage controlled oscillator 1203 is defined as K3[rad/(sec·V)], the loop gain K is obtained by K=K1×K2×K3/N. Since the phase comparator 1201 represents the phase difference of, for example, $2\pi$ [rad] by the voltage such as 2[V], the following expression can be obtained; K1=2/($2\pi$)≈0.318[V/rad]. The voltage controlled oscillator 1203 generally gains the conversion factor such as 100[ppm/V] if making use of a crystal oscillator. When the oscillation frequency is set to, for example, 44.736 MHz that is the DS3 bit rate in North America, K3 is obtained as K3=28.1×10³ [rad/(sec·V)]. The gain of the direct-current amplifier 1202 is set as, for example, K2=5, with small amplifier rate, so that the output of the direct-current amplifier 1202 would not be saturated. At this time, when N=3008, K=14.9. The loop gain K is equal to the jitter cut-off frequency of the PLL circuit, which is about 2.36[Hz]. However, the jitter cut-off frequency of the PLL circuit is preferably set to about 1 to 10 ppm of the oscillation frequency. If the jitter cut-off frequency becomes much smaller than this, the phase noise suppression characteristic will be deteriorated, and on the contrary, if it becomes larger than this, the input jitter suppression characteristic will be deteriorated. Accordingly, in this example, the jitter cut-off frequency is preferably within about 45 to 450 Hz. As is apparent from this, the loop gain in the above-mentioned numerical example (2.36[Hz]) is too small.

As a countermeasure to prevent such a situation, a method of increasing the gain of the direct-current amplifier 1202 may be considered, by way of example. However, in order to let the jitter cut-off frequency be 1 ppm of the oscillation frequency, it is necessary to fix the value of the gain K2 of the direct-current amplifier 1202 at around 1200. Then, since the output of the phase comparator 1201 varies in the range of 2[V], the output of the direct-current amplifier 1202 varies in the range of 2400[V]. Obviously, the direct-current amplifier 1202 would be saturated under this condition, and the PLL circuit will not perform the accurate operation at the frequency extraction time. As mentioned above, it is not preferable to prevent the decrease of the loop gain by increasing the gain of the direct-current amplifier 1202.

When the frequency division ratio of the PLL circuit is so large such as "3008", the conventional SRTS receiver cannot realize proper characteristics.

SUMMARY OF THE INVENTION

An object of the present invention is to provide an SRTS receiver improved in the phase noise characteristic by providing a plurality of interpolation pulses in the period of the RTS information transfer to lessen the frequency division ratio for the phase synchronous oscillation means.

According to one aspect of the invention, an SRTS receiver, receiving RTS information generated through latching output of a counter activated by a reference clock in N (N≧2, where N is integer)-clock cycle of a user clock at a transmitter side, for generating pulses of N-clock cycle of the user clock on average based on the RTS information and applying the generated pulses to phase synchronous oscillation means so as to reproduce the user clock, the SRTS receiver comprises RTS information receiving means for receiving the RTS information to generate pulses based on the received RTS information, interpolation pulse generating means for generating interpolation pulse signals to be inserted in the pulses generated by the RTS information receiving means, and pulse combining means for combining the interpolation pulses supplied from the interpolation pulse generating means and the pulses generated by the RTS information receiving means.

The interpolation pulse generating means may restart on the condition of receiving the pulses generated by the RTS information receiving means.

In the preferred construction, the RTS information receiving means comprises a first counter activated by the reference clock, a second counter, activated by the reference clock, for generating a gate signal when counting a predetermined number of cycles of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit.

In the preferred construction, the interpolation pulse generating means comprises an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving a predetermined constant value and the output of the D-flip flop circuit, the interpolation pulse generating means supplying the output of the third counter as interpolation pulses.

In the preferred construction, the RTS information receiving means comprises a first counter activated by the reference clock, a second counter, activated by the reference clock, for generating a gate signal when counting a predetermined number of cycles of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit, the interpolation pulse generating means comprises an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving a predetermined constant value and the output of the D-flip flop circuit, the interpolation pulse generating means supplying the output of the third counter as interpolation pulses, and the pulse combining means comprises a selecting circuit for selecting either the output pulse of the gate circuit or the interpolation pulses supplied from the third counter and supplying it, according to the output of the second counter.

In another preferred construction, the interpolation pulse generating means comprises a computing circuit for computing difference values of the received RTS information, a decoder for discriminating the computed difference values, an encoder for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the encoder, the interpolation pulse generating means supplying the output of the third counter as interpolation pulses.

In another preferred construction, the RTS information receiving means comprises a first counter activated by the reference clock, a second counter, activated by the reference clock, for generating a gate signal when counting a predetermined number of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit, the interpolation pulse generating means comprises a computing circuit for computing difference values of the received RTS information, a decoder for discriminating the computed difference values, an encoder for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the encoder, the interpolation pulse generating means supplying the output of the third counter as interpolation pulses; and the pulse combining means comprises a selecting circuit for selecting either the output pulse of the gate circuit or the interpolation pulses supplied from the third counter and supplying it, according to the output of the second counter.

Also, the RTS information receiving means comprises a first counter activated by the reference clock, a second counter, activated by the reference clock, for generating a gate signal when counting a predetermined number of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit;

the interpolation pulse generating means comprises a computing circuit for computing difference values of the received RTS information, a decoder for discriminating the computed difference values, an encoder for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the encoder, the interpolation pulse generating means supplying the output of the third counter as interpolation pulses, and the pulse combining means always selects the output of the interpolation pulse generating means and supplies it.

Also, the interpolation pulse generating means comprises a computing circuit for computing difference values of the received RTS information, a decoder for discriminating the computed difference values, first and second encoders for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the first encoder, the interpolation pulse generating means setting the frequency division of the third counter according to the output value of the second encoder and supplying the output of the third counter as interpolation pulses.

In another preferred construction, the RTS information receiving means comprises a first counter activated by the reference clock, a second counter, activated by the reference clock, for generating a gate signal when counting a predetermined number of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit, the interpolation pulse generating means comprises a computing circuit for computing difference values of the received RTS information, a decoder for discriminating the computed difference values, first and second encoders for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the first encoder, the interpolation pulse generating means setting the frequency division of the third counter according to the output value of the second encoder and supplying the output of the third counter as interpolation pulses; and the pulse combining means comprises a selecting circuit for selecting either the output pulse of the gate circuit or the interpolation pulses supplied from the third counter and supplying it, according to the output of the second counter.

In another preferred construction, the RTS information receiving means comprises a first counter activated by the reference clock, a second counter, activated by the reference clock, for generating a gate signal when counting a predetermined number of the reference clock, a comparator for comparing the count values of the first counter to the received RTS information, and generating pulses when they are in one accord, a gate circuit for passing an output pulse of the comparator upon receipt of the gate signal supplied from the second counter, and taking means for taking the next received RTS information at once to store it temporarily and supply it, and resetting the second counter according to the output pulse of the gate circuit, the interpolation pulse generating means comprises a computing circuit for computing difference values of the received RTS information, a decoder for discriminating the computed difference values, first and second encoders for supplying predetermined values according to the discrimination result of the decoder, an adder with "m" (m≧2, where m is integer) as modulus for repeating the addition by a predetermined constant value, a D-flip flop circuit for latching addition results of the adder, and a third counter, activated by the reference clock, for executing M1(M1≧M2, where M1 is integer) frequency division or M2(M2≧2, where M2 is integer, M2≠M1) frequency division alternatively according to carry signal output of the adder, the adder receiving the output of the D-flip flop circuit and the output value of the first encoder, the interpolation pulse generating means setting the frequency division of the third counter according to the output value of the second encoder and supplying the output of the third counter as interpolation pulses, and the pulse combining means always selects the output of the interpolation pulse generating means and supplies it.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 8 is a view showing the results of calculating the relationship between all the difference values of the received RTS values and the intervals of output pulses in the gate circuit, according to the embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In some instances, well-known structures are not shown in detail in order to avoid unnecessarily obscuring the present invention.

Figure 1:
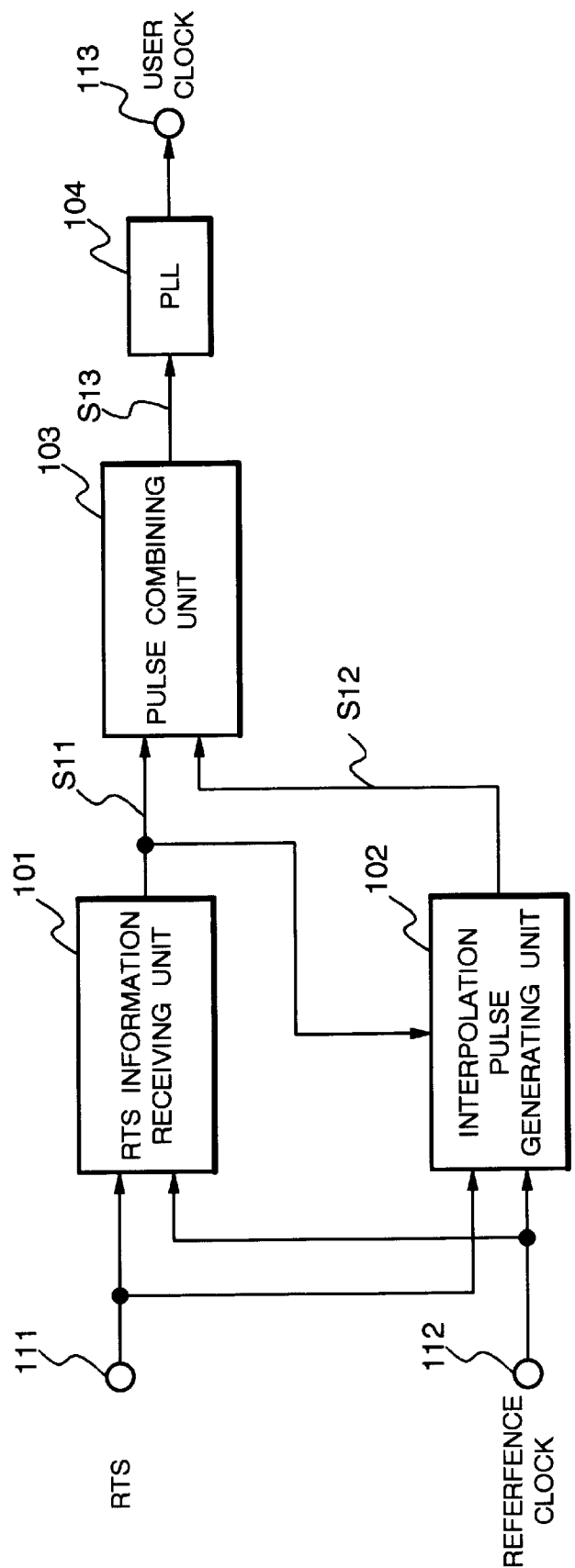
FIG. 1 is a block diagram showing a constitution of the SRTS receiver according to an embodiment of the present invention.
Figure 2:
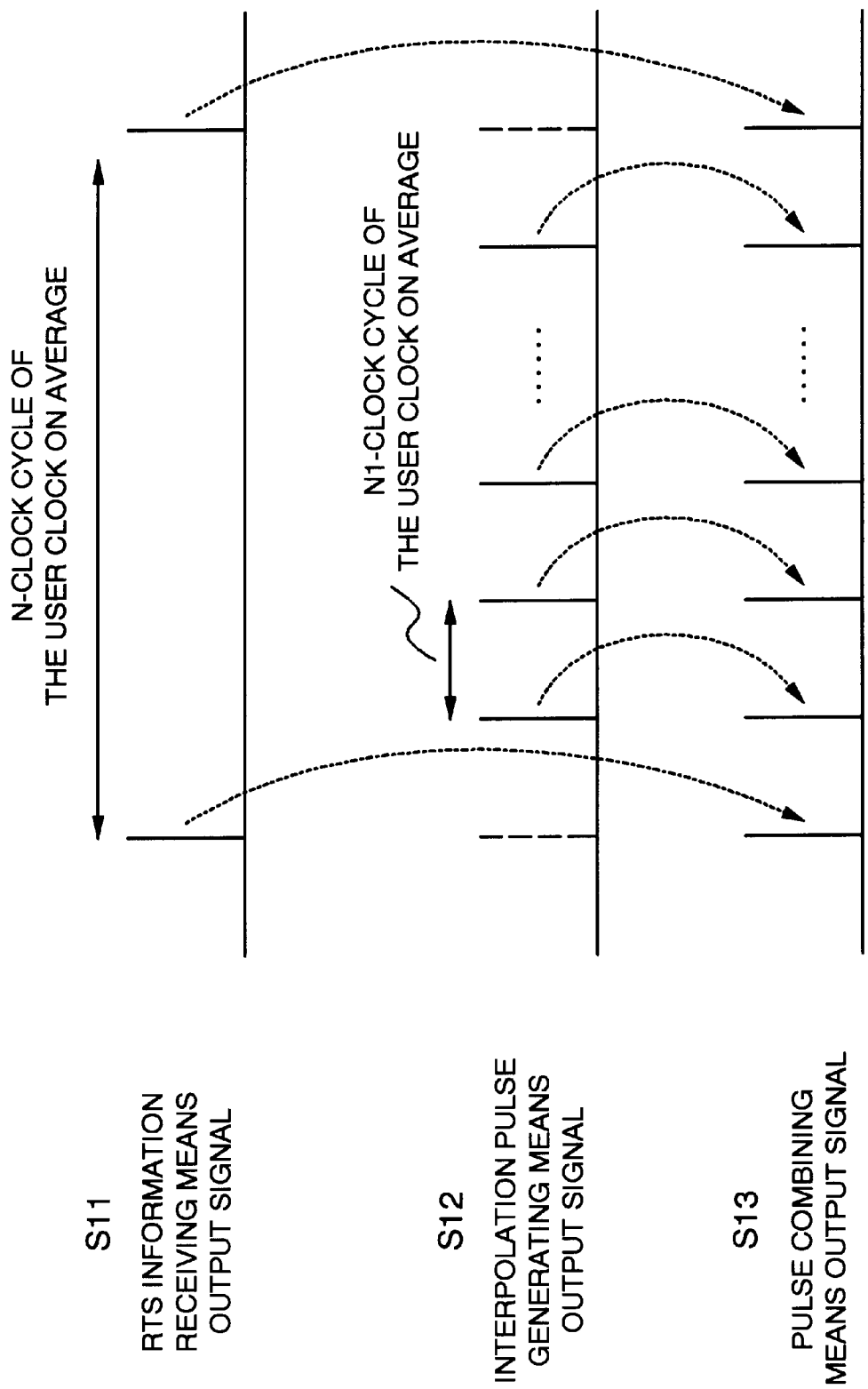
FIG. 2 is a view for use in describing the operation of the SRTS receiver of FIG. 1.
Figure 9:
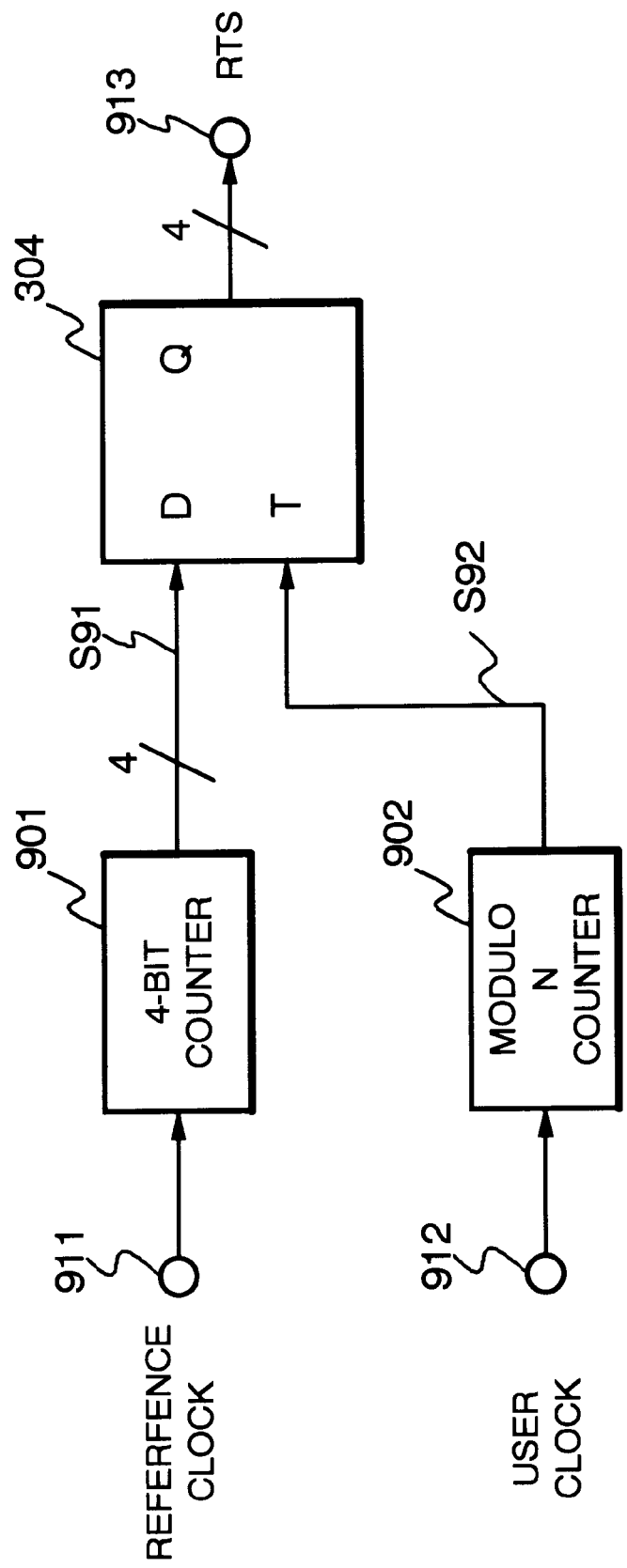
FIG. 9 is a block diagram showing a constitutional example of the RTS information creating circuit shown in ITU-T, recommendation I. 363.

FIG. 1 is a block diagram showing a constitution of a SRTS receiver according to an embodiment of the present invention, and FIG. 2 is a view for use in describing an operation of the SRTS receiver of FIG. 1. With reference to FIG. 1, the SRTS receiver of the embodiment comprises a RTS information receiving unit 101, an interpolation pulse generating unit 102, a pulse combining unit 103, and a PLL circuit 104. The reference clock and the RTS information supplied from the RTS information creating unit shown in FIG. 9 are supplied to the RTS information receiving unit 101 and the interpolation pulse generating unit 102, the output of the RTS information receiving unit 101 is supplied to the interpolation pulse generating unit 102 and the pulse combining unit 103, the output of the interpolation pulse generating unit 102 is supplied to the pulse combining unit 103, and the output of the pulse combining unit 103, that is the combined output including the output of the RTS information receiving unit 101 and the output of the interpolation pulse generating unit 102, is supplied through the PLL circuit 104 as the user clock. FIG. 1 shows only the characteristic components of the embodiment, while the description of other general components is omitted.

As illustrated in FIG. 2, the output signal S11 of the RTS information receiving unit 101 is a pulse signal having an N-clock period of the user clock on average. The interpolation pulse generating unit 102 operates so as to generate pulses each having an N1-clock cycle of the user clock on average between the pulses of the output signal S11 of the SRTS receiving unit 101. The pulse combining unit 103 interpolates the pulses of the output signal S12 of the interpolation pulse generating unit 102 between the pulses of the output signal S11 of the RTS information receiver 101 and supplies it to the PLL circuit 104. If "N1" corresponding to the period of the pulse signal S12 is a submultiple of "N" corresponding to the period of the pulse signal S11, the output signal S13 of the pulse combining unit 103 has an N1-clock period of the user clock on average and it becomes a train of substantially equally spaced pulses. Accordingly, the frequency division ratio of the PLL circuit 104 can be set to N1. For example, when "N" is "3008", "N1" may be "2", "4", "8", or "16", thereby preventing from decreasing the loop gain of the PLL circuit 104. The output signal S11 of the RTS information receiving unit 101 supplied to the interpolation pulse generating unit 102 is used as a restart signal and the interpolation pulse generating unit 102 is so controlled as to supply a pulse after about N1-clock period of the user clock upon receipt of the pulse signal S11.

Considering the case where the frequency division ratio of the PLL circuit 104 is "16", by way of example, since 3008÷16=188, the interpolation pulse generating unit 102 generates 16-clock period pulses of the user clock and the pulse combining unit 103 composes the pulses so that 187 pulses can intervene between the pulses of the output signal S11 of the RTS information receiving unit 101 and supplies it. In this way, the output signal S13 of the pulse combining unit 103 becomes a train of substantially equally spaced pulses oscillating in every 16-clock intervals of the user clock on average.

Figure 3:
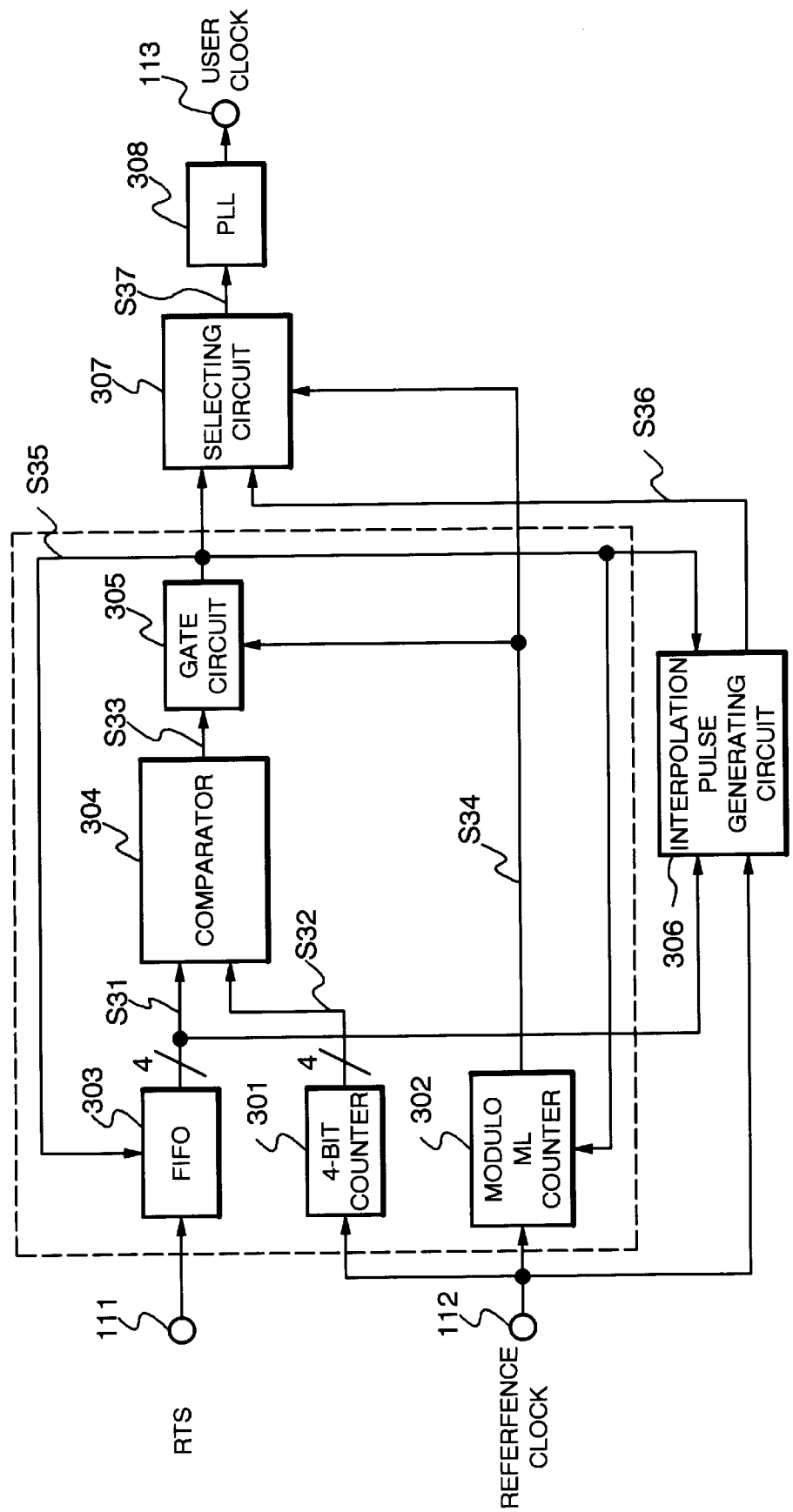
FIG. 3 is a block diagram showing the further detailed constitution of the SRTS receiver of the embodiment.

FIG. 3 is a block diagram showing the further detailed constitution of the RTS receiver of the embodiment. In the RTS receiver of the embodiment shown in FIG. 3, the dotted portion corresponds to the RTS information receiving unit 101 of FIG. 1. The RTS receiver comprises a 4-bit counter 301 and a modulo ML counter 302 for dividing the reference clock, a FIFO circuit 303 for once storing the RTS information, absorbing jitter delay in the ATM channel, and supplying it, a comparator 304, receiving the output signals S31 and S32 of the FIFO circuit 303 and the 4-bit counter 301 respectively, for generating pulses when the both signals are in accord with each other, and a gate circuit 305, upon receipt of the gate signal S34 supplied from the modulo ML counter, for passing the output pulse S33 of the comparator 304.

Figure 10:
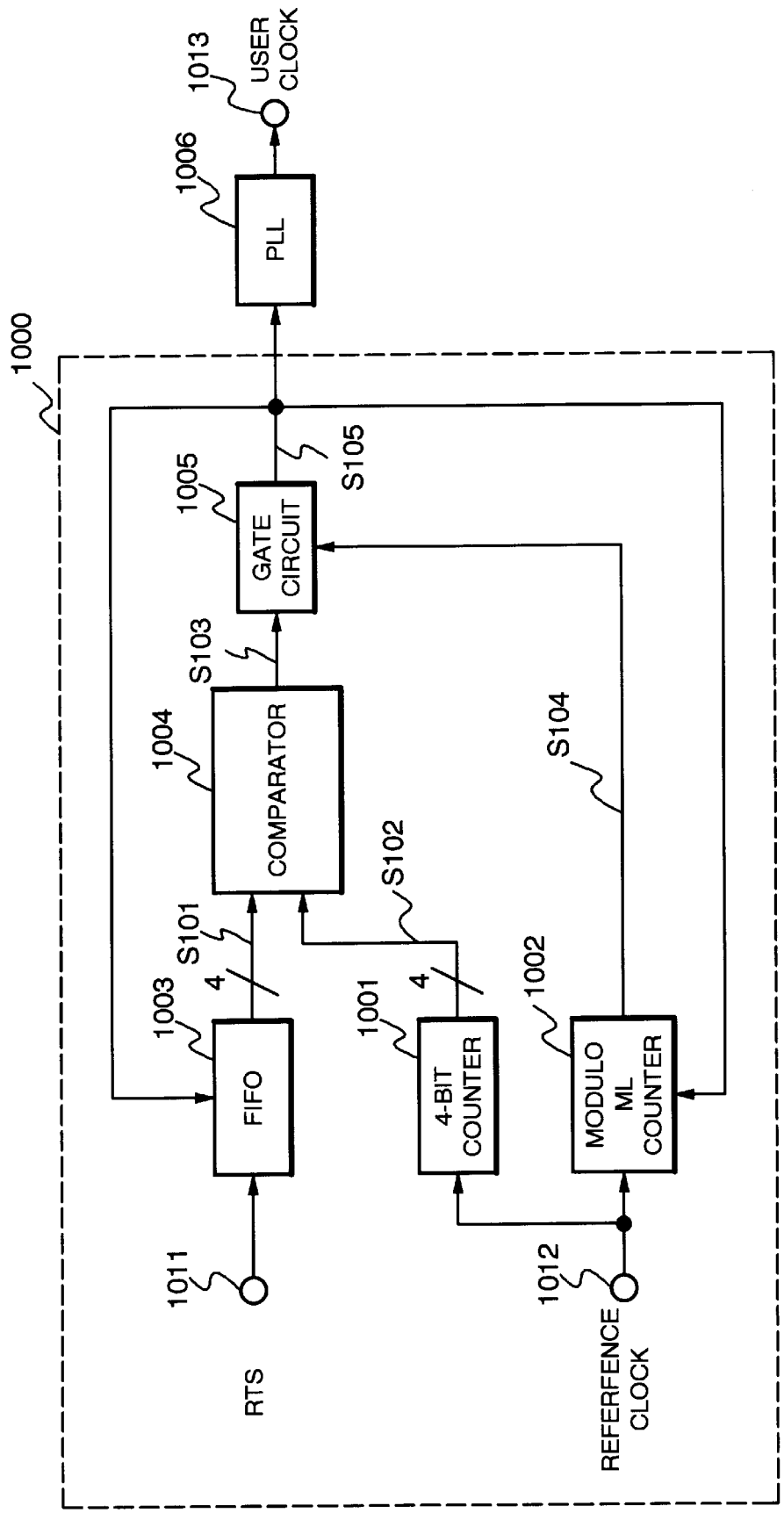
FIG. 10 is a block diagram showing a constitution of the conventional SRTS receiver.

Each function and operation of the above mentioned components of the RTS information receiving unit 101 is the same as that of each corresponding component of the conventional RTS information receiving means (refer to FIG. 10). With reference to FIG. 3, the output signal S31 of the FIFO circuit 303 and the output signal S35 of the gate circuit 305 are supplied to the interpolation pulse generating circuit 306. The interpolation pulse generating circuit 306 generates interpolation pulses to be inserted into the pulses of the gate output signal S35. As the pulse combining unit 103 of FIG. 1, employed is a selecting circuit 307 operating depending on the output signal S34 of the modulo ML counter 302. According to the output signal S34 of the modulo ML counter 302, when the gate circuit 305 is not open, the selecting circuit 103 selects and transfers the output signal S36 of the interpolation pulse generating circuit 306, while, when the gate circuit 305 is open, it selects and transfers the gate output S35.

Figure 4:
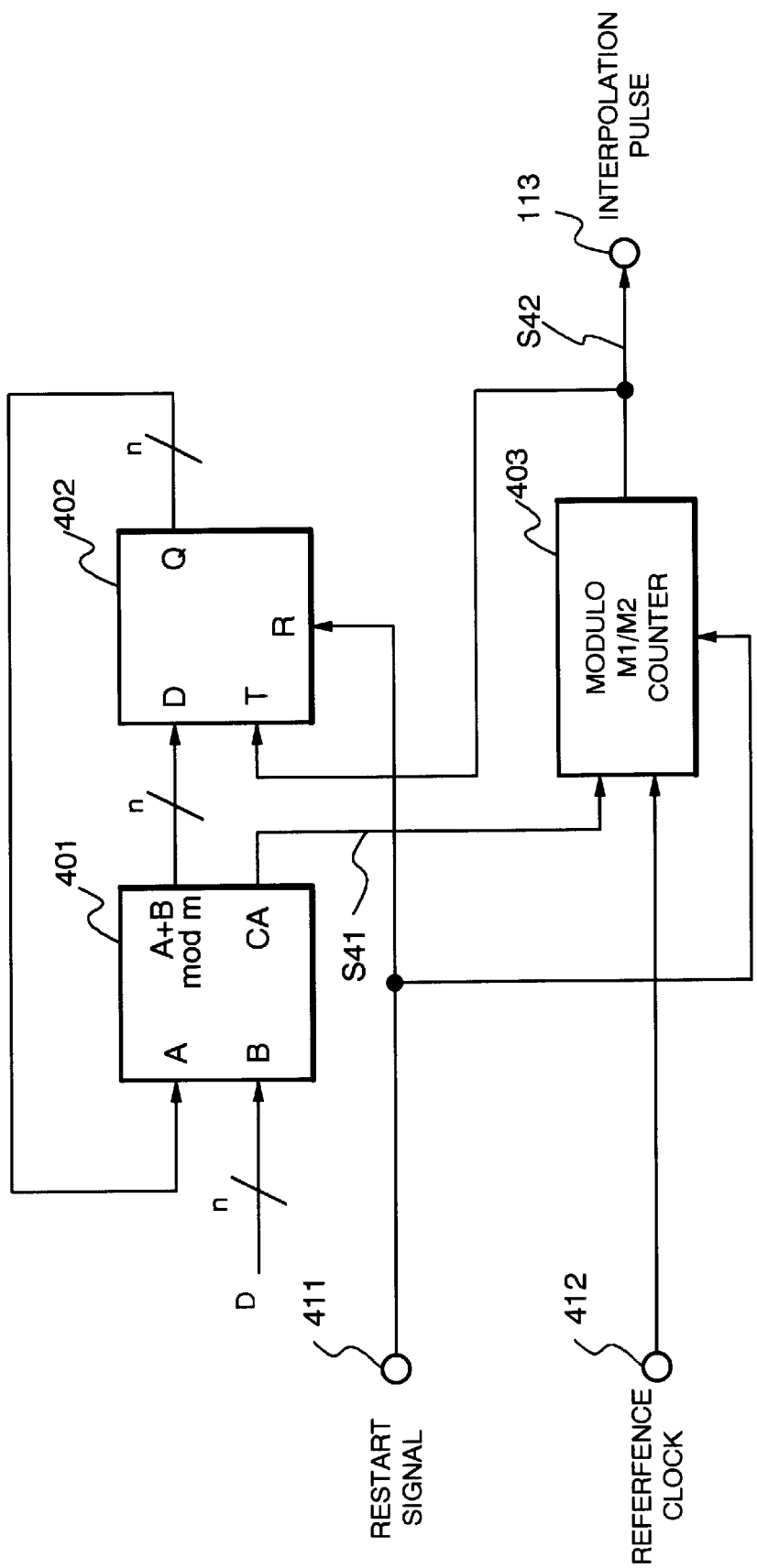
FIG. 4 is a block diagram showing a constitution of an interpolation pulse generating circuit in the SRTS receiver of FIG. 3.

FIG. 4 is a view showing the constitutional example of the interpolation pulse generating circuit 306 in the RTS receiver of FIG. 3. With reference to FIG. 4, the interpolation pulse generating circuit 306 comprises an n-bit adder 401 for letting a given number "m" (m≧2, where m is integer) be a modulus, a D-flip flop circuit 402 of n-bit for reserving the output of the n-bit adder 401, and a counter 403 for performing M1 frequency division or M2 frequency division. The adder 401 and the D-flip flop circuit 402 form an accumulator, on the whole.

The adder 401 repeats the addition by a predetermined integer "D" of n-bit. When the resultant value is beyond "m", it generates a carry signal S41. The modulo M1/M2 counter 403 is activated by the reference clock of the frequency fnx supplied from the input terminal 412, operating as a modulo M1 circuit when the output signal S41 of the adder 401 results in "0" and operating as a modulo M2 circuit when the output signal S41 results in "1". In other words, if counting the reference clock M1-times or M2-times, one pulse signal S42 is generated and supplied. The output signal S42 is transferred as an interpolation pulse and it is also transferred to the D-flip flop circuit 402 to activate it for the next accumulation operation. The restart signal is supplied from the input terminal 411, so to return the D-flip flop circuit 402 and the counter 403 to the initial state. When M1-clock or M2-clock of the reference clock has passed, after receiving the restart signal, the interpolation pulse will be supplied from the output terminal 413. In FIG. 3, if the gate output signal S35 is supplied to the interpolation pulse generating circuit 306 as the restart signal, the output pulse S36 is supplied from the interpolation pulse generating circuit 306 as illustrated in FIG. 3 when M1-clock or M2-clock of the reference clock has passed since the pulse generation of the gate output signal S35 in FIG. 3. Therefore, the phase relation between the pulse of the gate output signal S35 and the output pulse S36 of the interpolation pulse generating circuit 306 is properly controlled, so that the output signal S37 of the selecting circuit 307 becomes a train of substantially equally spaced pulses.

The above-mentioned operation will be described by use of concrete numerical examples, by way of example, in case of fs=44.736 MHz that is the DS3 bit rate in the North America. According to I. 363, the reference clock frequency fnx is 77.76 MHz. When N=3008, Mq=5228. Therefore, the gate circuit 305 of FIG. 3 passes some pulses once in every 5228-clock cycle or 5229-clock cycle of the reference clock. Assuming that the frequency division ratio of the PLL circuit 308 is "16", since 3008÷16=188, the counter 403 of FIG. 4 must operate so that 188 pulses can be generated during 5228-clock cycle or 5229-clock cycle of the reference clock.

Hereinafter, consideration will be taken for the case where 188 pulses are generated in every 5228-clock cycle of the reference clock. Since 5228÷188=27+152/188, the interpolation pulses to be generated by the interpolation pulse generating circuit 306 must be spaced in every 27-clock or 28-clock of the reference clock so that the interpolation pulse generating circuit 306 would preferably generate them, on average, once in every $27+152/188$ clock. For this purpose, the adder 401, the D-flip flop circuit 402, and the modulo M1/M2 counter 403 should be set as follows; D=152, m=188, M1=27, M2=28. The adder 401 operates so as to do the accumulation of D=152 and when the resultant value comes to m=188 or more, the carry signal S41 is generated. When 152 is 188 times added repeatedly at mod188, the carry signal S41 is generated 152 times, out of them, and the carry signal S41 is not generated the rest 188−152=36 times. Accordingly, the counter 403 executes 27-dividing operations 36 times and 28-dividing operations 152 times at this time. When the both sides of 5228÷188=27+$^{152}/_{188}$ are multiplied by 188, 5228=27×36+28×152 can be obtained. Apparently, the counter 403 generates 188 pulses during 5228-clock cycle of the reference clock as is desired.

Although the description has been, hereinabove, made about the case of generating 188 pulses during 5228-clock cycle of the reference clock, apparently, this can be applied also to the other cases.

In FIG. 3, when fs=44.736 MHz, fnx=77.76 MHz, and N=3008 as mentioned above, the pulse intervals of the output signal S35 of the gate circuit 305 is 5228-clock cycle or 5229-clock cycle of the reference clock. The output signal S36 of the interpolation pulse generating circuit 306 always generates pulses 188 times during 5228-clock of the reference clock, and even when the pulse interval of the output signal S35 of the gate circuit 305 is 5229-clock cycle of the reference clock, the selecting circuit output signal S37 becomes a train of substantially equally spaced pulses, thereby causing no practical problem. However, it is also possible to automatically adjust the pulse interval of the output signal S36 of the interpolation pulse generating circuit 306 fine depending on the interval of the pulse signal S35. As this kind of technique, a method disclosed in, for example, Japanese Patent Publication Laid-Open (Kokai) No. Heisei 7-38570 "SRTS Control Method" can be used. This publication discloses a technique of, with attention to the fact that a train of adopting the difference values of the RTS train is in the form of approximate simple repetition, generating expected values of the RTS information to be received next, setting the output within the tolerance frequency deviation at a receiving party while oscillating the PLL circuit at around the center frequency by the use of the expected RTS information instead of the received RTS information if the RTS information is lost in a channel, and thereafter letting the PLL circuit converge more rapidly upon receipt of the proper RTS information.

Figure 5:
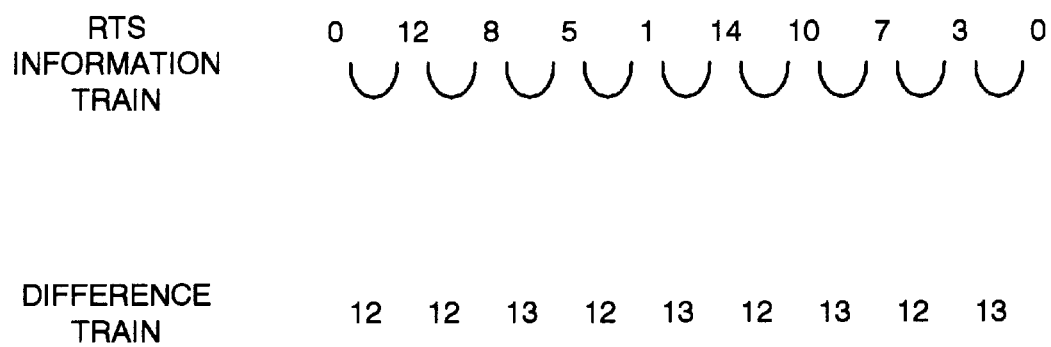
FIG. 5 is a view for use in describing the difference train of the RTS information train.
Figure 6:
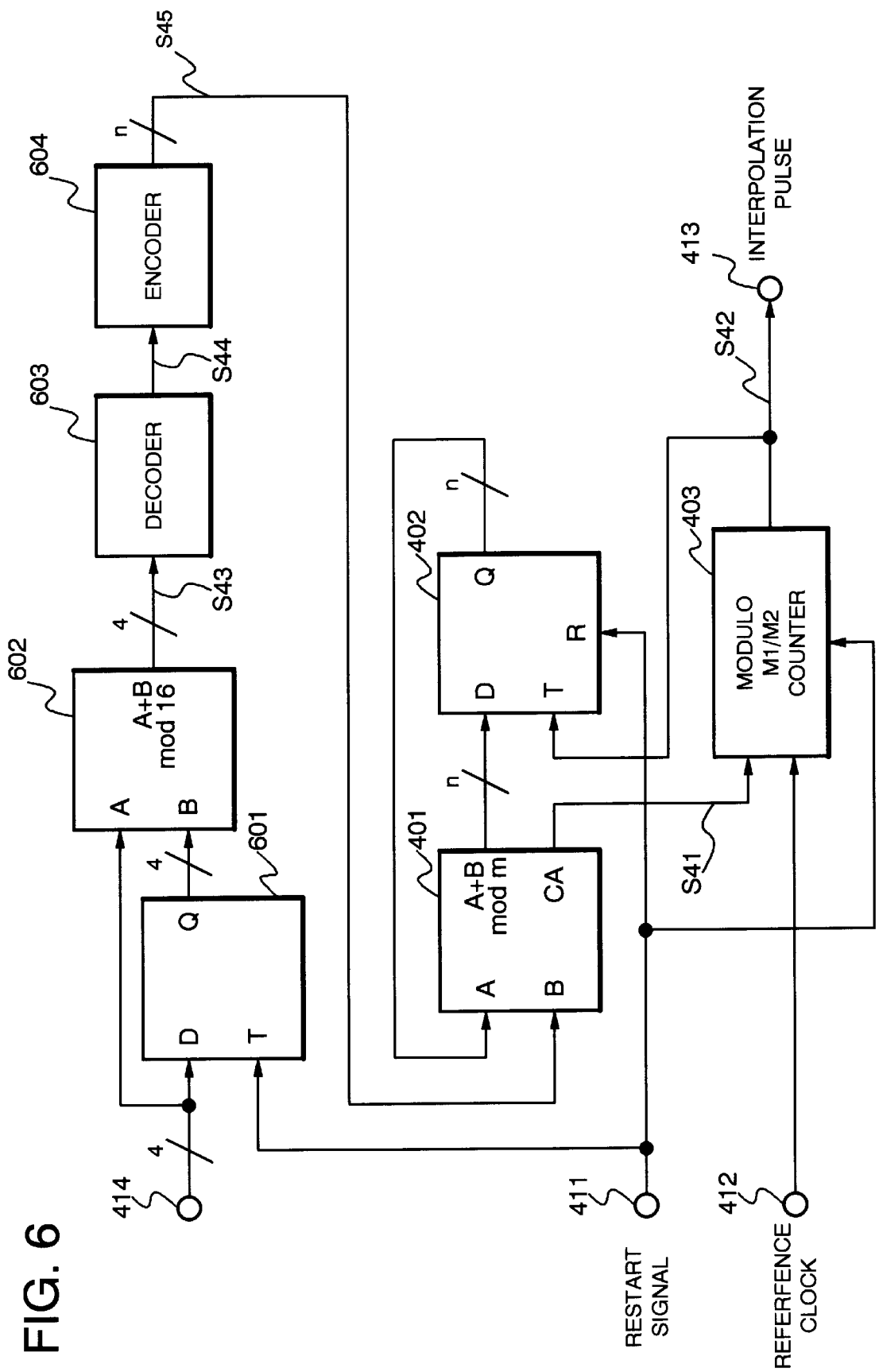
FIG. 6 is a block diagram showing another constitution of the interpolation pulse generating circuit in the SRTS receiver of FIG. 3.

A train taking the difference values of the RTS train becomes approximate simple repetition as disclosed in the same publication. For example, when fs=44.736 MHz, fnx=77.76 MHz, and N=3008 similarly to the above, "12" or "13" appears by turns in the difference train of the RTS values as illustrated in FIG. 5. When the difference value is "12", the interval of the output pulse S35 of the gate circuit 305 in FIG. 3 is 5228-clock cycle of the reference clock, and when the difference value is "13", it is 5229-clock cycle. This makes it possible to require a difference value of the RTS, so to adjust the interval of the interpolation pulse S36 depending on the difference value. FIG. 6 is a block diagram showing a constitutional example of such an interpolation pulse generating circuit. In FIG. 6, the same reference marks are attached to the identical components of the interpolation pulse generating circuit of FIG. 4.

With reference to FIG. 6, the interpolation pulse generating circuit comprises a D-flip flop circuit 601 for storing the RTS value temporarily, a 4-bit subtraction circuit 602 of mod16 for calculating the difference value between the RTS value and the output signal of the D-flip flop circuit 601, a decoder 603 for judging the calculated value of the subtraction circuit 602, and an encoder 604 for encoding the judgement result of the decoder 603, to supply its predetermined n-bit integer. In the interpolation pulse generating circuit 306, an input terminal 414 receives the RTS value of 4 bits read out from the FIFO circuit 303 of FIG. 3. The D-flip flop circuit 601 of 4 bits is holding the RTS value which was used once ahead of this time. The 4-bit subtraction circuit 602 of mod16 generates the result of subtracting the RTS value once ahead of this from the received RTS value at mod16. Thus, difference train as shown in FIG. 5 appears in the output signal S43 of the subtraction circuit 602. The decoder 603 judges what value is the difference value of the output signal S43 and the output signal S44 showing the judgement result is submitted to the encoder 604. The encoder 604 supplies the predetermined n-bit integer according to the judgement result indicated by the output signal S44.

The specific description will be made again, by way of example, in the case of fs=44.736 MHz, fnx=77.76 MHz, and N=3008. As described above, when the interval of the output pulse S35 of the gate circuit 305 of FIG. 3 is 5228-clock cycle of the reference clock, D=152 may be given in the D-flip flop circuit 402 of the interpolation pulse generating circuit 306 of FIG. 4. When the interval of the output pulse S35 is 5229-clock cycle of the reference clock, since 5229÷188=27+$^{153}/_{188}$, D=153 may be given in the D-flip flop circuit 402. This time, the decoder 603 in the interpolation pulse generating circuit 306 of FIG. 6 judges whether the difference value of the output signal S43 is "12 or "13". When the difference value of the output signal S43 is "12", the encoder 604 supplies the integer "152" as the output signal S45, and when the difference value of the output signal S43 is "13", it supplies the integer "153" as the output signal S45. Hereinafter, the interpolation pulse generating circuit of FIG. 6 will perform the same operation as the interpolation pulse generating circuit 306 shown in FIG. 4 to generate interpolation pulses.

Although the decoder 603 discriminates the difference value of the output signal S43 only by "12" or "13" in the above-mentioned description, there are usually sixteen kinds of difference values of the output signal S43 because of mode16. If the encoder 604 supplies the output signal S45 of a proper value in three or more kinds of difference values, it is possible to activate the PLL circuit 104 only with the output signal S12 of the interpolation pulse generating unit 102 without using the pulse of the output signal S11 of the RTS information receiving unit 101 in the SRTS receiver of FIG. 1. At this time, the pulse combining unit 103 only transfers the output signal S12 supplied from the interpolation pulse generating unit 102 to the PLL circuit 104 as it is. This constitution will be described hereinafter.

Figure 11:
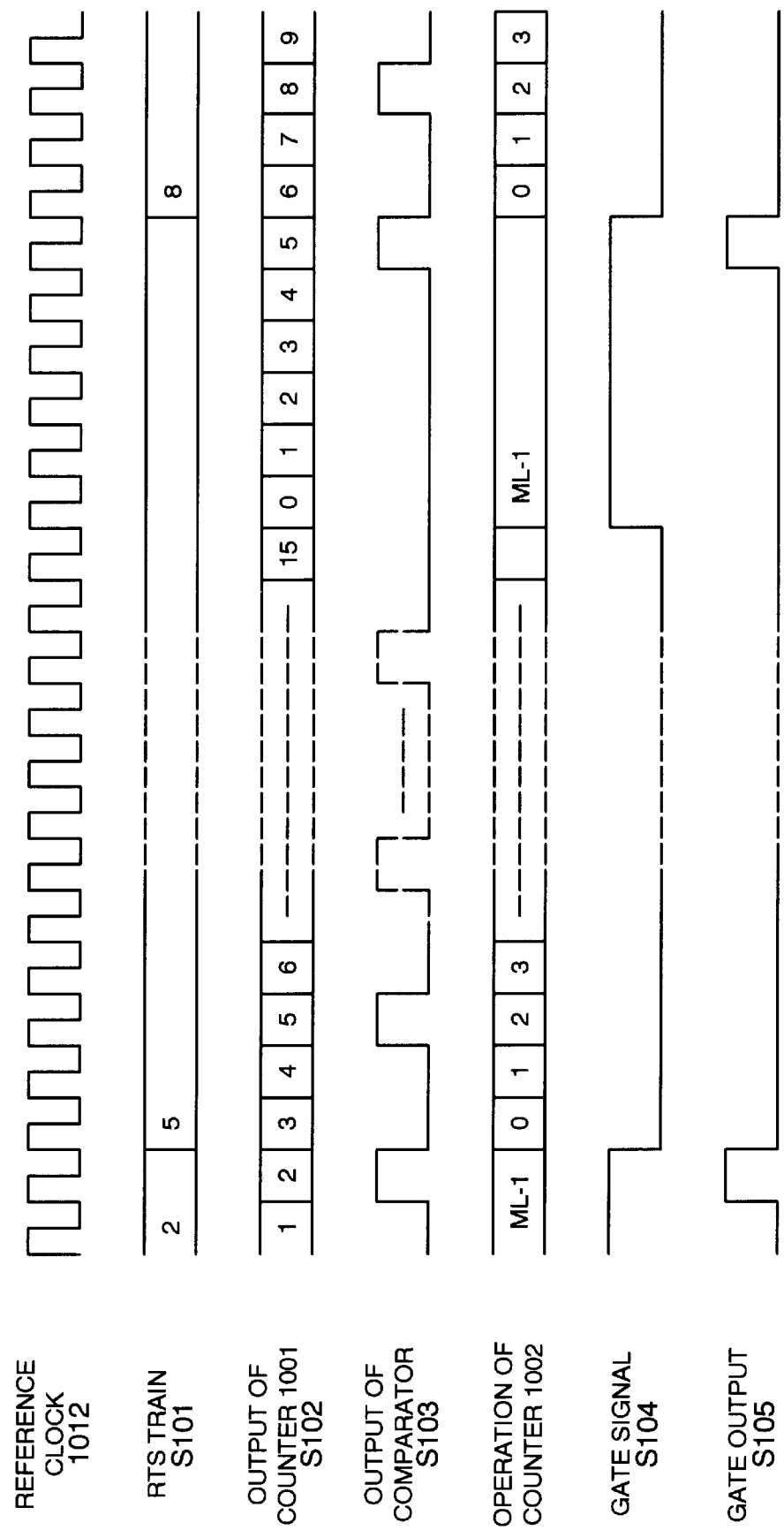
FIG. 11 is a time chart showing an operation of the SRTS receiver shown in FIG. 10.
Figure 12:
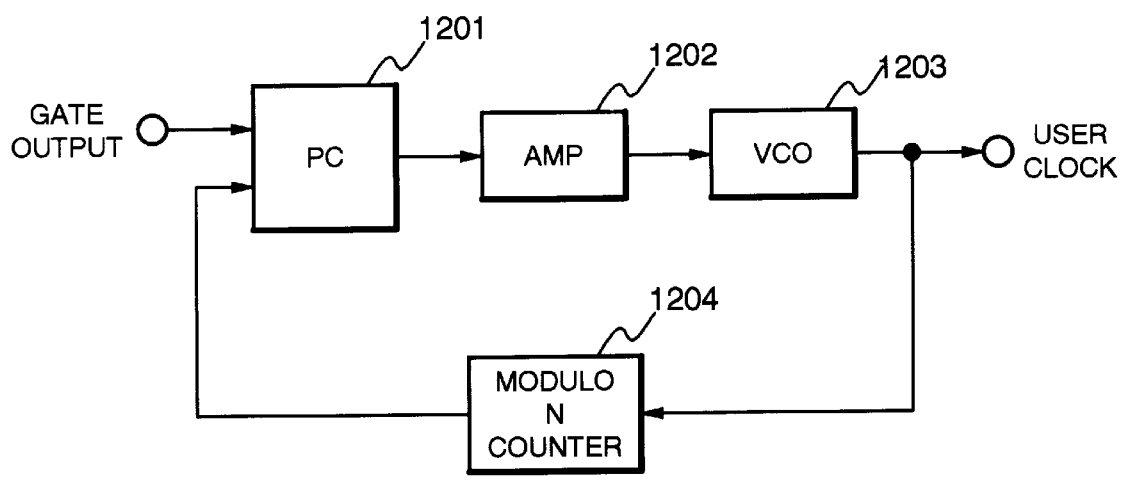
FIG. 12 is a block diagram showing an example of the PLL (phase locked loop) circuit within FIG. 10.

Assume that the interval of the output pulse S35 of the gate circuit 305 in FIG. 3 is "a"-clock cycle of the reference clock and the difference value of the received RTS value is "d". According to I. 363, the RTS value is four bits and the difference value "d" should be considered under the condition of mod16, corresponding to the range "0" to "15". At this time, the relationship between "a" and "d" may be given by d≡a mod16. According to this relationship, even if "d" is given, "a" cannot be decided fully. However, considering that the modulo ML counter 302 is fixed as ML=Mq-8 according to I. 363 in FIG. 3, "a" can be determined fully if "d" is given, where Mq is the value for the case where fs is the nominal value. As is apparent from the time chart of FIG. 11, since the gate signal S34 of FIG. 3 closes the gate circuit 305 during ML clock of the reference clock after the preceding output pulse S35 of the gate circuit 305, the interval "a" of the output pulse S35 of the gate circuit 305 becomes at least ML-clock cycle. Similarly, as is apparent from the time chart of FIG. 11, since the comparator 304 of FIG. 3 generates the pulse S33 in every 16-clock of the reference clock, the gate circuit 305 necessarily generates one pulse S35 during the cycle from ML clock to ML+15 clock of the reference clock after the preceding output pulse S35 of the gate circuit 305. Accordingly, the interval "a" of the output pulse S35 of the gate circuit 305 becomes ML+15-clock cycle at the maximum. The condition such as ML$\geq$a$\geq$ML+15 can be established. According to this condition and the relationship d$\equiv$a mod16, "a" can be determined if "d" is given.

FIG. 8 is a view showing the result of calculating the relation between every difference value of the received RTS values and interval of the output pulse S35 of the gate circuit 305 in the embodiment. The specific description will be made again with reference to FIG. 8, by way of example, in the case where fs=44.736 MHz, fnx=77.76 MHz, and N=3008. At this time, the relation between every difference value of the received RTS values and interval of the output pulse S35 of the gate circuit 305 is as illustrated in FIG. 8. Since ML=5228-8=5220 in the above example, the interval "a" of the output pulse S35 of the gate circuit 305 is 5220$\geq$a$\geq$5235. The value within this range is being selected for the interval of the output pulse S35 of the gate circuit 305 corresponding to the difference value.

Considering the case where the difference value of the received RTS value is "4", the interval of the output pulse S35 of the gate circuit 305 becomes 5220-clock cycle of the reference clock. However, since 5220$\div$188=27+$^{144}/_{188}$, the output signal S45 of the encoder 604 is "144". Similarly, each value of the output signal S45 of the encoder 604 can be calculated in every case, which is as shown in FIG. 8. Therefore, if controlling the operation of the encoder 604 so as to supply the values according to the correspondence as shown in FIG. 8 for the difference values of the received RTS values, in the interpolation pulse generating circuit 306 of FIG. 6, a train of substantially equally spaced interpolation pulses can be generated for every difference value.

The interpolation pulse generating circuit 306 of FIG. 6 predicts the timing of the output pulse S35 of the gate circuit 305 of FIG. 3 by the difference value of the received RTS value, while performing an interpolating operation of the interpolation pulse S36. Therefore, when the difference value obtained from the received RTS value is detectable by the decoder 603, the interpolation pulse generating circuit 306 operates so as to generate the interpolation pulse S36 inevitably at the timing of the output pulse S35. If the decoder 603 of FIG. 6 is designed to detect all the difference values and the encoder 604 is designed to supply a proper value as required in the above, the selecting circuit 307 of FIG. 3 may be designed to always select only the interpolation pulse S36, where the selecting circuit 307 is not necessary in practice.

Figure 7:
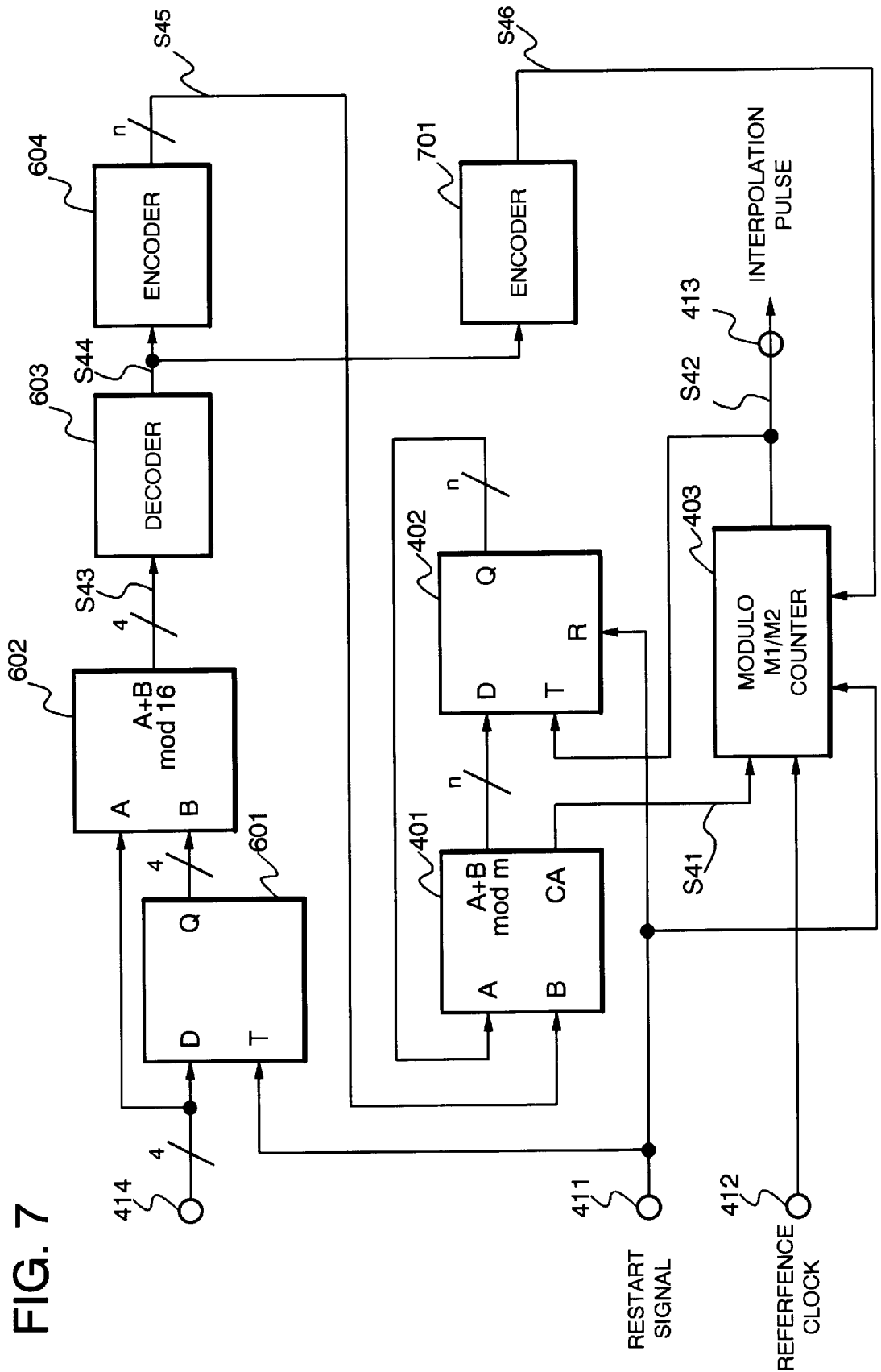
FIG. 7 is a block diagram showing further another constitution of the interpolation pulse generating circuit in the SRTS receiver of FIG. 3.

In FIG. 6, there may be some cases in which it is necessary to change the frequency division ratio M1/M2 of the modulo M1/M2 counter 403 according to the difference value of the RTS information, that is the output signal S43 of the subtraction circuit 602. FIG. 7 is a block diagram showing a constitutional example of the interpolation pulse generating circuit 306 for use in this case. In FIG. 7, the encoder 701 sets the frequency division ratio M1 and M2 of the counter 403 according to the difference train signal S43 decoded by the decoder 603.

As the concrete numerical examples, in the case of fs=46.08 MHz, according to I. 363, the reference clock frequency is fnx=77.76 MHz, and if N=3008, Mq=5076. The difference train of the RTS information is obtained by calculating Mq by the modulus "16", and since 5076$\equiv$4mod16, the difference train becomes a constant value "4" when exactly fs=46.08 MHz. In order to realize "16" as the frequency division ratio of the PLL, since it can be completely divided as 5076$\div$188=27, the counter 403 is only to usually divide the reference clock by 27-clock cycle. When M1=27 and the difference value of the output signal S43 of the subtraction circuit 602 is "4", the value of the output signal S45 of the encoder 604 must be set to "0". However, there is usually a jitter in the user clock, and fs is not always 46.08 MHz, but the jitter in the range of ±20 ppm should be considered. For example, when fs becomes a little smaller, the difference train of the RTS information will include not only the constant value "4" but also "5". Then, the pulse interval of the output signal S11 of the RTS information receiving unit 101 of FIG. 1 will become 5077-clock cycle of the reference clock cycle. At this time, since 5077$\div$188=27+$^{1}/_{188}$, where M2=28, when the difference value of the output signal S43 of the subtraction circuit 602 is "2", the value of the output signal S45 of the encoder 604 must be "1". On the other hand, when fs becomes a little larger, the difference train of the RTS information will include "3" and the pulse interval of the output signal S11 of the RTS information receiving unit 101 of FIG. 1 will be 5076-clock cycle of the reference clock cycle. At this time, since 5076$\div$188=26+$^{187}/_{188}$, where M1=26 and M2=27, when the difference value of the output signal S43 of the subtraction circuit 602 is "3", the value of the output signal S45 of the encoder 604 must be "187", and when the difference value of the output signal S43 of the subtraction circuit 602 is "4", the value of the output signal S45 of the encoder 604 must be "188". In these ways, there may be some cases in which the frequency division ratio of the counter 433 must be changed depending on the difference value of the RTS information.

Since the frequency division ratio "M1" and "M2" of the counter 403 is decided according to the difference train signal S43, in the interpolation pulse generating circuit 306 of FIG. 7, a proper operation can be realized there even in case of changing the frequency division ratio of the counter 403 because of the jitter of the user clock frequency fs as mentioned above.

As set forth hereinabove, since the SRTS receiver of the present invention is provided with interpolation pulse generating means for generating interpolation pulses filling in the space between pulses generated according to the received RTS information, in order to reproduce a user clock by applying the generated pulses to phase synchronous oscillating means, it is capable of decreasing the frequency division ratio by providing a plurality of pulses to be generated by the interpolation pulse generating means in the period of the RTS information transfer for the phase synchronous oscillating means, thereby improving the phase noise characteristic.

This can prevent from the deterioration in the quality of the user clock reproduced by the SRTS receiver.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An SRTS receiver, receiving RTS information generated through latching output of a counter activated by a reference clock in N (N≧2, where N is integer)-clock cycles of a user clock at a transmitter side, for generating pulses of N-clock cycles of the user clock on average based on the RTS information and applying the generated pulses to a phase synchronous oscillation means so as to reproduce the user clock, said SRTS receiver comprising:

RTS information receiving means for receiving the RTS information to generate pulses based on the received RTS information;

interpolation pulse generating means for generating interpolation pulse signals to be inserted between the pulses generated by said RTS information receiving means; and pulse combining means for combining the interpolation pulses supplied from said interpolation pulse generating means and the pulses generated by said RTS information receiving means.

2. An SRTS receiver as set forth in claim 1, wherein said interpolation pulse generating means restarts on the condition of receiving the pulses generated by said RTS information receiving means.

3. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit.

4. An SRTS receiver as set forth in claim 1, wherein said interpolation pulse generating means comprising an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving a predetermined constant value and the output of said D-flip flop circuit, said interpolation pulse generating means supplying the output of said third counter as interpolation pulses.

5. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit;

said interpolation pulse generating means comprising an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving a predetermined constant value and the output of said D-flip flop circuit, said interpolation pulse generating means supplying the output of said third counter as interpolation pulses; and said pulse combining means comprising a selecting circuit for selecting either the output pulse of said gate circuit or the interpolation pulses supplied from said third counter and supplying it, according to the output of said second counter.

6. An SRTS receiver as set forth in claim 1, wherein said interpolation pulse generating means comprising a computing circuit for computing difference values of the received RTS information, a decoder for discriminating the computed difference values, an encoder for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said encoder, said interpolation pulse generating means supplying the output of said third counter as interpolation pulses.

7. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit;

said interpolation pulse generating means comprising a computing circuit for computing difference values of the received RTS information, a decoder for discriminating the computed difference values, an encoder for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said encoder, said interpolation pulse generating means supplying the output of said third counter as interpolation pulses; and said pulse combining means comprising a selecting circuit for selecting either the output pulse of said gate circuit or the interpolation pulses supplied from said third counter and supplying it, according to the output of said second counter.

8. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit;

said interpolation pulse generating means comprising a computing circuit for computing difference values of the received RTS information, a decoder for discriminating the computed difference values, an encoder for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said encoder, said interpolation pulse generating means supplying the output of said third counter as interpolation pulses; and said pulse combining means always selects the output of said interpolation pulse generating means and supplies it.

9. An SRTS receiver as set forth in claim 1, wherein said interpolation pulse generating means comprising a computing circuit for computing difference values of the received RTS information, a decoder for discriminating the computed difference values, first and second encoders for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said first encoder, said interpolation pulse generating means setting the frequency division of said third counter according to the output value of said second encoder and supplying the output of said third counter as interpolation pulses.

10. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit;

said interpolation pulse generating means comprising a computing circuit for computing difference values of the received RTS information, a decoder for discriminating the computed difference values, first and second encoders for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said first encoder, said interpolation pulse generating means setting the frequency division of said third counter according to the output value of said second encoder and supplying the output of said third counter as interpolation pulses; and said pulse combining means comprising a selecting circuit for selecting either the output pulse of said gate circuit or the interpolation pulses supplied from said third counter and supplying it, according to the output of said second counter.

11. An SRTS receiver as set forth in claim 1, wherein said RTS information receiving means comprising a first counter activated by the reference clock, a second counter, activated by the reference clock, for generating a gate signal when counting a predetermined number of the reference clock, a comparator for comparing the count values of said first counter to the received RTS information, and generating pulses when they are in one accord, a gate circuit for passing an output pulse of said comparator upon receipt of the gate signal supplied from said second counter, and taking means for taking the next received RTS information at once to store it temporarily and supply it, and resetting said second counter according to the output pulse of said gate circuit;

said interpolation pulse generating means comprising a computing circuit for computing difference values of the received RTS information, a decoder for discriminating the computed difference values, first and second encoders for supplying predetermined values according to the discrimination result of said decoder, an adder with "m" (m≧2, where m is integer) as modulus for repeating the addition by a predetermined constant value, a D-flip flop circuit for latching addition results of said adder, and a third counter, activated by the reference clock, for executing M1(M1≧M2, where M1 is integer) frequency division or M2(M2≧2, where M2 is integer, M2≠M1) frequency division alternatively according to carry signal output of said adder, said adder receiving the output of said D-flip flop circuit and the output value of said first encoder, said interpolation pulse generating means setting the frequency division of said third counter according to the output value of said second encoder and supplying the output of said third counter as interpolation pulses; and said pulse combining means always selects the output of said interpolation pulse generating means and supplies it.

12. An SRTS receiver comprising:

an RTS information receiver operative to receive RTS information and to generate pulses based on the received RTS information;

an interpolation pulse generator operative to generate interpolation pulses based on the pulses generated by said RTS information receiver; and a pulse combiner operative to combine the interpolation pulses supplied from said interpolation pulse generator and the pulses generated by said RTS information receiver.

13. An SRTS receiver as claimed in claim 12 wherein said interpolation pulse generator comprises:

a modulo counter operative to count pulses of a reference clock;

a D-flip-flop operative to receive an output from said modulo counter and produce an n-bit result; and an n-bit adder operative to add said n-bit result from said D-flip-flop and a predetermined n-bit integer, and to provide said D-flip-flop with a primary result of said addition operation and to provide said modulo counter with a secondary result of said addition operation.

14. An SRTS receiver as claimed in claim 12 wherein said RTS information receiver comprises:

a comparator producing pulses when the output of a counter matches RTS information output from a FIFO circuit;

a gate circuit receiving the pulses from said comparator and an output of a modulo counter and operative to produce gate circuit pulses when the pulses from said comparator and said output of the modulo counter are both active.

15. An SRTS receiver as claimed in claim 14 wherein said pulse combiner comprises a selecting circuit operative to produce combined pulses in accordance with the output of said modulo counter whereby said selecting circuit receives and passes said gate circuit pulses when the output of said modulo counter is active and said selecting circuit receives and passes said interpolation pulses when the output of said modulo counter is inactive.

16. An SRTS receiver as claimed in claim 12 wherein said pulse combiner comprises:

a selecting circuit operative to alternately select either the pulses generated by said interpolation pulse generator or the pulses generated by said RTS information receiver.

* * * * *

UNITED STATES PATENT AND TRADEMARK OFFICE
CERTIFICATE OF CORRECTION

PATENT NO. : 6,101,196
DATED : August 8, 2000
INVENTOR(S) : Kurenai MURAKAMI

It is certified that error appears in the above-indentified patent and that said Letters Patent is hereby corrected as shown below:

Column 13, line 10, delete " $ML \geqq a \geqq ML$ " insert -- $ML \leqq a \leqq ML$ --

Column 14, line 22 delete " "2" " insert --"S"--.

Signed and Sealed this

Fifteenth Day of May, 2001

*Attest:*

NICHOLAS P. GODICI

*Attesting Officer*     *Acting Director of the United States Patent and Trademark Office*